P. & B. DE MATTIA.
PNEUMATIC TIRE BUILDING APPARATUS.
APPLICATION FILED SEPT. 23, 1915.

1,194,967.

Patented Aug. 15, 1916.
2 SHEETS—SHEET 1.

WITNESSES

INVENTORS
Peter De Mattia
Barthold De Mattia
BY
ATTORNEYS

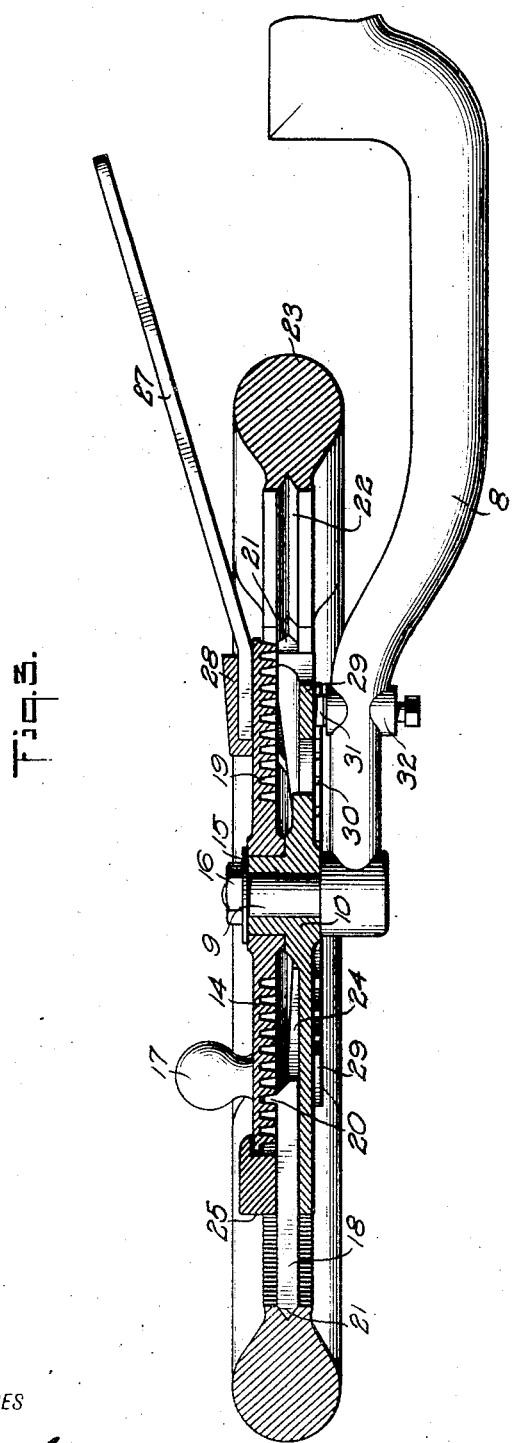

UNITED STATES PATENT OFFICE.

PETER DE MATTIA AND BARTHOLD DE MATTIA, OF CLIFTON, NEW JERSEY.

PNEUMATIC-TIRE-BUILDING APPARATUS.

1,194,967.

Specification of Letters Patent. Patented Aug. 15, 1916.

Application filed September 23, 1915. Serial No. 52,177.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Pneumatic-Tire-Building Apparatus, of which the following is a full, clear, and exact description.

Among the principal objects which the present invention has in view are: to provide means for rapidly centering and holding in operative relation a metal core of conventional construction for building automobile tires preparatory to molding the same; to provide means for mechanically centering the core accurately; to provide means for mechanically accommodating cores of a variety of diameters; to prevent the expansion or breaking of the core at the centering groove; and to steady the core in action.

Figure 1:
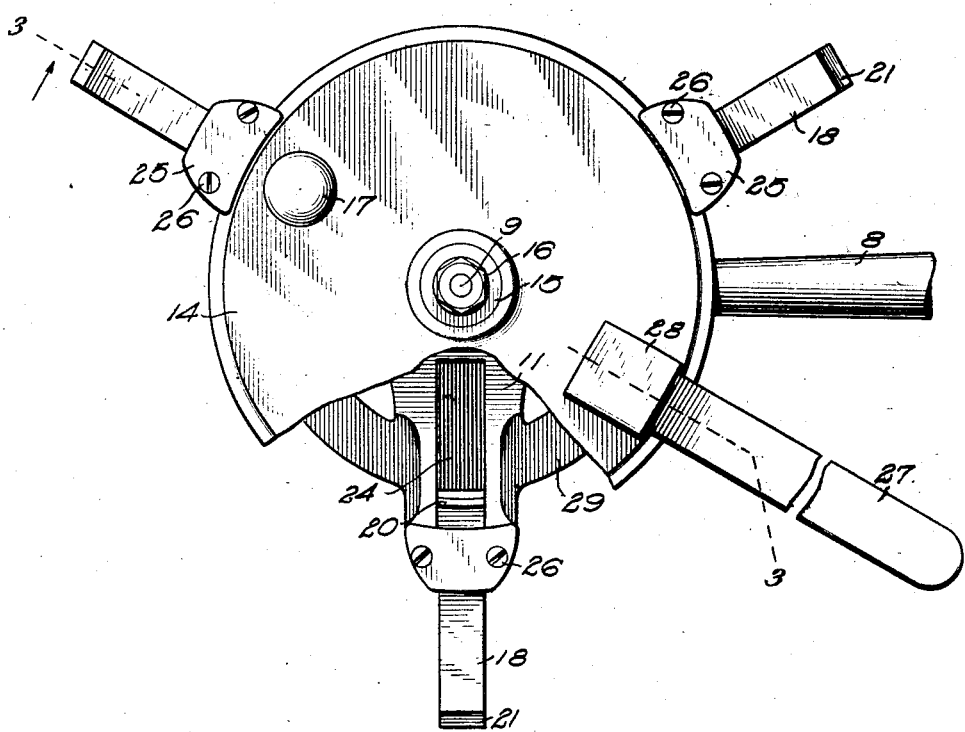
Figure 2:
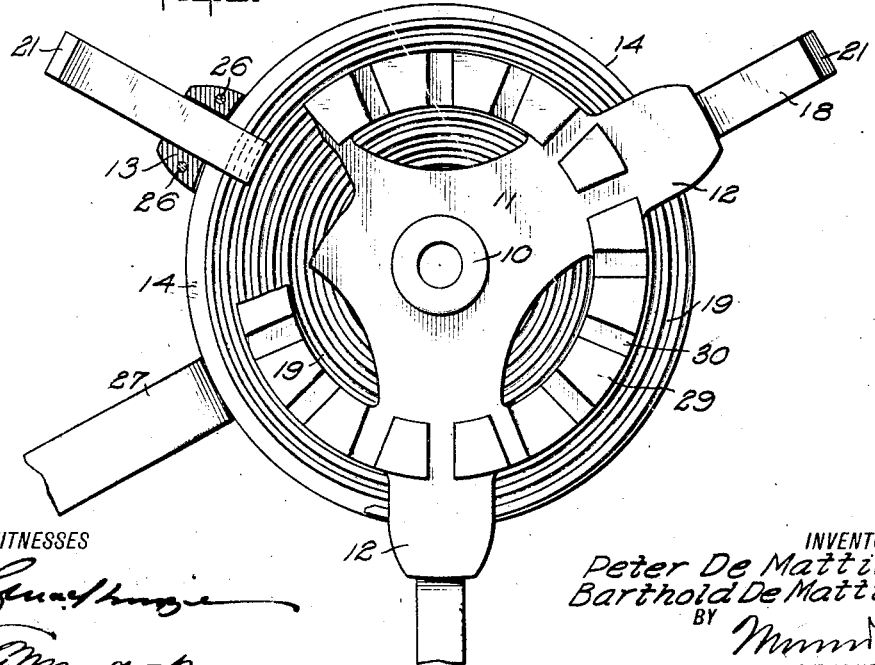

*Drawings.*—Figure 1 is a top plan view of a centering chuck constructed and arranged in accordance with the present invention, part of the chuck plate being cut away to show the construction thereunder; Fig. 2 is a bottom view of the same; and Fig. 3 is a section on an enlarged scale, the section being taken as on the line 3—3 in Fig. 1, the chuck being shown in conjunction with a tire core.

*Description.*—As seen in the drawings, the chuck is pivotally mounted on a supporting bracket arm 8. The mounting for the chuck consists of a stud shaft 9. The shaft 9 extends through a bearing 10 of the bottom frame plate 11. The plate 11 is spider form, the arms 12 thereof having guide posts 13 arranged to form a cage for the grooved plate 14.

The plate 14 is pivotally mounted on the bearing 10 of the plate 11. The two plates are held in service relation by a washer 15 and a nut 16, as best seen in Fig. 3 of the drawings, the end of the shaft 9 being reduced and threaded to receive the said nut. The plate 14 is rotated on the bearing formed by the plate 11, a handle 17 serving this purpose. The object for rotating the plate 14 is to extend and retract the centering bars 18. To this end, the plate 14 is provided with a spiral groove 19 into which extend the spurs 20 formed at the inner end of each of the bars 18.

The bars 18 are oblong and rectangular in cross section. The outer ends 21 of each of the bars are wedge shaped or shaped to conform with the groove 22 formed in the inner periphery of a core, such as indicated by the numeral 23 in Fig. 1 of the drawings. Cores of this character are conventionally made with grooves, such as indicated by the numeral 22 in Fig. 3. From the foregoing it will be seen that as the operator revolves the plate 14 on its bearing, the plate 11 and the posts 13 remaining stationary, the spurs 20 and bars 18 connected therewith are moved to and from the center of the plate 11.

To receive the bars 18, the posts 13 and arms 12 are provided with central channels 24 in which the said arms rest and by which they are guided in their movement to and from the center of the plate 11. To clamp the bars 18 in the posts 13, the caps 25 are secured on the said posts by means of the screws 26 or other suitable devices. When the caps 25 are drawn hard down, the bars 18 are held from shifting. The overhang of the caps 25 also binds on the edge of the plate 14, and prevents the rotation thereof. This assists in holding the apparatus in the set or adjusted position.

After the plate 14 has been rotated to seat the ends 21 of the bars 18 in the grooves 22 of the core 23, additional pressure is exerted upon the said bars 18 to more closely hold the said core on the said bars by means of an elongated hand bar 27. To receive the inner end of the bar 27, a socketed projection is formed on the upper side of the plate 14. After the bar 27 has served its purpose of tightening the grip of the bars 18 on the core 23, it is withdrawn from the socketed projection 28 to avoid interfering with the wrapping of the tire material upon the core 23.

To fix the operating position of the core 23 and to govern the step-by-step rotation thereof, there is provided a ring 29, having a series of notches 30 formed therein. A plunger latch 31 is mounted in a pocket formed in the cylinder 32, with which the arm 8 is provided, as shown best in Fig. 3 of the drawings. The head of the latch 31 is wedge shaped, so that when the plate 11, ring 29 and core 23 are moved positively, the plunger latch releases a notch to engage the next successive, in a manner conventional to machines of this character.

*Operation.*—Machines employing a bracket arm, such as the arm 8, shown in the drawings, are arranged to permit the said arm to swing on a pivot at the end removed from that having the shaft 9. In this way, the plates 11 and 14 may be turned to a vertical plane when the core 23 is adjusted on the bars 18. During the adjustment of the core 23, the bars 18 are retracted, so that the core passes freely over the said bars. The core is then lowered to rest on the two uppermost of the three bars 18. The operator then using the handle 17 rotates the plate 14 to extend the bars 18. This action continues until the ends 21 of all of the bars 18 rest in the groove 22. The arm 8 may now be rotated on its pivot to move the plates 11 and 14 and the core 23 in the horizontal position, best shown in Fig. 3 of the drawings. While in this position, the bar 27 is adjusted to the socketed projection 28 and is then used to force the bars 18 into closer hold on the core 23. The arm 27 being removed, the core is now in position to be wrapped in the manner usual to the manufacture of tires of the character indicated. When the wrapping has been completed, the operation above described is reversed to permit the removal of the core and the tire wrapped thereon.

Claims:

1. An apparatus as characterized comprising a rotary support, said support embodying a bracket arm; a rotary plate pivotally mounted on said arm and having guide members disposed radially thereto; a plurality of expansion bars slidably mounted on said plate in engagement with said guide members; a key plate superposed on said rotary plate, said key plate having a spiral member operatively engaging all of said bars for moving the same to and from the center of said rotary plate as said plate is rotated; and means mounted on said rotary plate for locking said bars in adjusted position.

2. An apparatus as characterized comprising a rotary support, said support embodying a bracket arm; a rotary plate pivotally mounted on said arm and having guide members disposed radially thereto; a plurality of expansion bars slidably mounted on said plate in engagement with said guide members; a key plate superposed on said rotary plate, said key plate having a spiral member operatively engaging all of said bars for moving the same to and from the center of said rotary plate as said plate is rotated; and means mounted on said rotary plate for locking said bars in adjusted position, said means embodying a plurality of caps fitting said guide members and clamping said bars on said rotary plate, and screw-threaded devices for forcing said caps in engagement with said bars.

In witness whereof we have signed our names to this specification in the presence of two subscribing witnesses.

PETER DE MATTIA.
BARTHOLD DE MATTIA.

Witnesses:
MARY BURKHARDT,
MILES C. WHITEHEAD.